United States Patent [19]

Beller

[11] Patent Number: 4,592,335
[45] Date of Patent: Jun. 3, 1986

[54] SLANT ADJUSTABLE GRILL

[75] Inventor: Frank W. Beller, Aurora, Ill.

[73] Assignee: Belson Manufacturing Co., Inc., North Aurora, Ill.

[21] Appl. No.: 735,479

[22] Filed: May 17, 1985

[51] Int. Cl.$^4$ ............................................. A47J 37/00
[52] U.S. Cl. ................................. 126/25 A; 126/9 R; 126/25 R
[58] Field of Search ............ 126/9 R, 9 A, 9 B, 25 R, 126/25 A, 25 AA, 29, 30, 220

[56] References Cited

U.S. PATENT DOCUMENTS

| | | | |
|---|---|---|---|
| 3,053,245 | 9/1962 | Beller | 126/25 A |
| 3,085,562 | 4/1963 | Persinger et al. | 126/25 R |
| 3,191,592 | 6/1965 | Lorbacher | 126/9 R |
| 3,583,385 | 6/1971 | Beller | 126/25 A |
| 4,488,535 | 12/1984 | Johnson | 126/25 A |

*Primary Examiner*—James C. Yeung
*Attorney, Agent, or Firm*—Lee, Smith & Zickert

[57] ABSTRACT

A slant adjustable grill for use with large outdoor cooking devices is provided. The slant adjustable grill is cooperative with two grill support panels located at opposite ends of the firebox. The grill support panels include slanted slots for the selective engagement with handle means extending outwardly from the grill. The grill is rendered capable of vertical adustment or slant adjustment in either the front/back or right/left mode. Additionally, a domed lid may be used in cooperation with the slant adjustable grill and provides access cutout means whereby the user may vertically or slant adjust the grill to the desired position. The slant adjustable grill is also fully removable from the device as well as being pivotable to an open position to grant access to the firebox.

8 Claims, 4 Drawing Figures

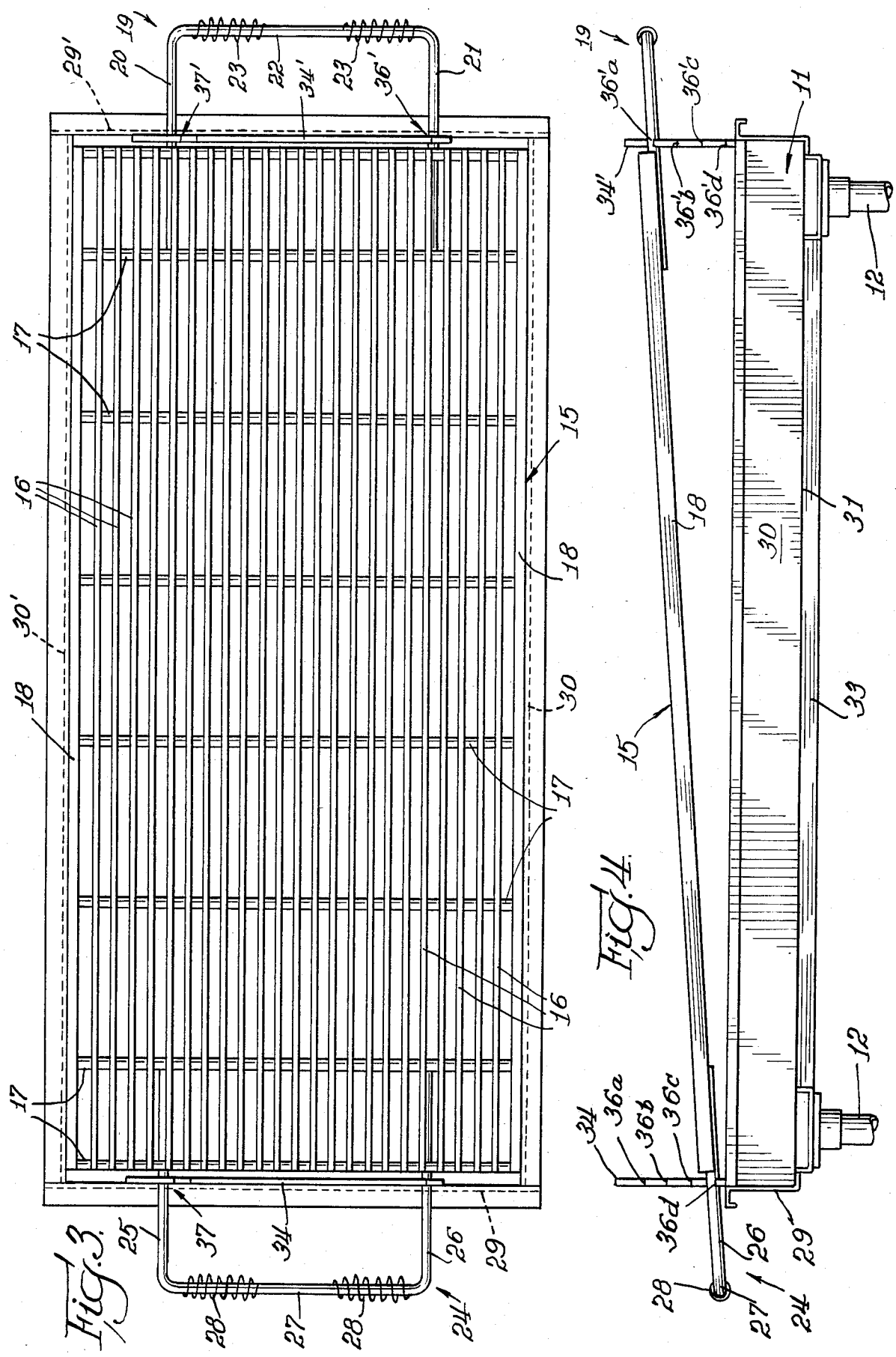

SLANT ADJUSTABLE GRILL

BACKGROUND AND SUMMARY OF THE INVENTION

The invention relates to an adjustable grill for use in an outdoor cooking device such as a roaster or large oven that may be gas, charcoal, wood or mesquite fired.

The invention is particularly suited to large volume cooking devices in which the firebox is appropriately sized to accommodate a heat source beneath a grill having an expansive cooking surface of up to about ten square and larger. With this size, a significant amount of food may be cooked, such as required for a group or club picnic and the like.

Due to the wide variety of foods to be cooked, and the requirement for different heating of these items, it has been very advantageous to provide adjustability to the grill relative to the fire bed in order to dispose the food items at the appropriate elevation over the fire.

In the past, the adjustment to these large grills has taken the form of vertical adjustment means which may either utilize spaced apart slots, or handle slide tracks, which permit two people to stand at opposite ends of the cooking device and arrange the grill at an appropriate level.

Certain smaller sized "backyard-type" cooking grills have also provided a grill that, in addition to vertical adjustment, allows for the pivoting of the grill so that it remains held by the cooking device in an open position allowing the user to restoke the charcoal, or the like, contained in the firebox.

It has been found that in conjunction with the foregoing adjustability of known grills, a further advantage would be to provide a grill that is slant adjustable so that certain items may be held at one level above the fire bed while others are placed at a different levels. This would be important when, for example, rare steaks are to be cooked along with well-done steaks. Additionally, should a certain portion of the food become ready to eat, it would be a benefit to allow it to be placed at a higher elevation above the fire bed and kept warm, while other steaks or hamburgers may be placed closer to the fire in order to cook them in sequence. Coupled with the foregoing advantages, it has also been learned that the various adjustments set forth above would be particularly helpful if they could be accomplished while a lid or cover is arranged over the firebox. This additional feature would eliminate the need for the chef to open the lid and release the heated gases surrounding the food items. Such would be the case when large fowl is being cooked where it is important to maintain a high constant temperature throughout cooking. Thus, the ability to vertically adjust and slant adjust a grill from the exterior of a closed cooking device would significantly advance the art of large volume outdoor cooking.

The foregoing needs have been satisfied by the present invention in which a wide variety of cooking devices may be provided with the novel slant adjustable grill described hereinafter.

In brief summary, the invention may be described as a plated grill having longitudinal grill members transversely crossed thereunder by spaced apart support rods. The grill is preferably rectangular in form and the long sides of the rectangular shape may be provided with support channels for rigidity and sturdiness. Projecting from opposite ends of the grill, are handle means which extend outwardly of the ends of the firebox and include two parallel extending arms integrally formed with a transverse handle for gripping and maneuvering the grill. Each handle means thereby has a front and rear extending arm. The front extending arms and the rear extending arms are coaxial. The extending arms are cooperative with grill support panels mounted at opposite ends of the firebox whereby the operator may adjust the grill in the vertical direction, pivot it away from the firebox for allowing access to the heat source, or slant adjust the grill to dispose the grill either at a left/right slant, or a transverse front/back slant.

When utilizing a cover, such as a domed lid over the firebox, the adjustability is further enhanced by the provision of cooperative and particularly formed lid access cut-outs allowing the user to manipulate the position of the extending arms of the handles at both sides of the cooking device in order to permit the vertical or slant adjustment to be made while the lid remains closed over the grill.

The grill support panels are each provided with two vertical rows of downwardly slanting notches. Preferably, the two rows of notches at each grill support panel are comprised of four horizontally co-planar corresponding notches. One row of notches is formed at a front vertical edge of the support panel and is frontwardly open. The second row of notches is formed along the panel and is frontwardly defined by a vertical interior edge portion of the panel creating a passage in front of the slots. The front and rear notches of the two panels are arranged in two parallel vertical planes, and the two rows of notches of each panel are spaced apart substantially at the same width as the spacing of the two extending arms of the handle means arrangeable at the respective ends of the cooking device. The arrangement allows for all the extending arms of the handle means to be in a plurality of horizontal planes—all being parallel to the fire bed. The grill may also be slant adjusted whereby the extending arms at one support panel are positioned at the same notch elevation while the extending arms at the other support panel are at a lower or higher notch elevation. This last feature provides for a left/right slant adjustment to the grill. Additionally, the front extending arms of both of the handle means may be inserted into horizontally corresponding front notches at each panel while the rear extending arms of each handle means may be inserted at a higher or lower horizontally corresponding rear notches at each panel. Thereby a front/back slant adjustment may be obtained. The grill further may be pivoted around the axis of the two rear extending arms upons their engagement with the topmost notch at each said panel, whereby to allow the grill to be opened away from the fire bed. The grill may then be fully rotated to be supportively rested against a back wall of the firebox.

BRIEF DESCRIPTION OF THE DRAWINGS

FIG. 3 is a top view of the cooking device shown in FIG. 1, having the domed lid removed and showing the grill supported at the grill support panels arranged at opposite sides of the firebox; and, FIG. 4 is a front view of the cooking device shown in FIG. 1 having the domed lid removed, and showing the grill adjusted to a right-to-left, downwardly sloping position.

DESCRIPTION OF THE PREFERRED EMBODIMENT

The invention will best be explained with reference to the figures wherein like numerals throughout refer to the same elements.

Figure 1:
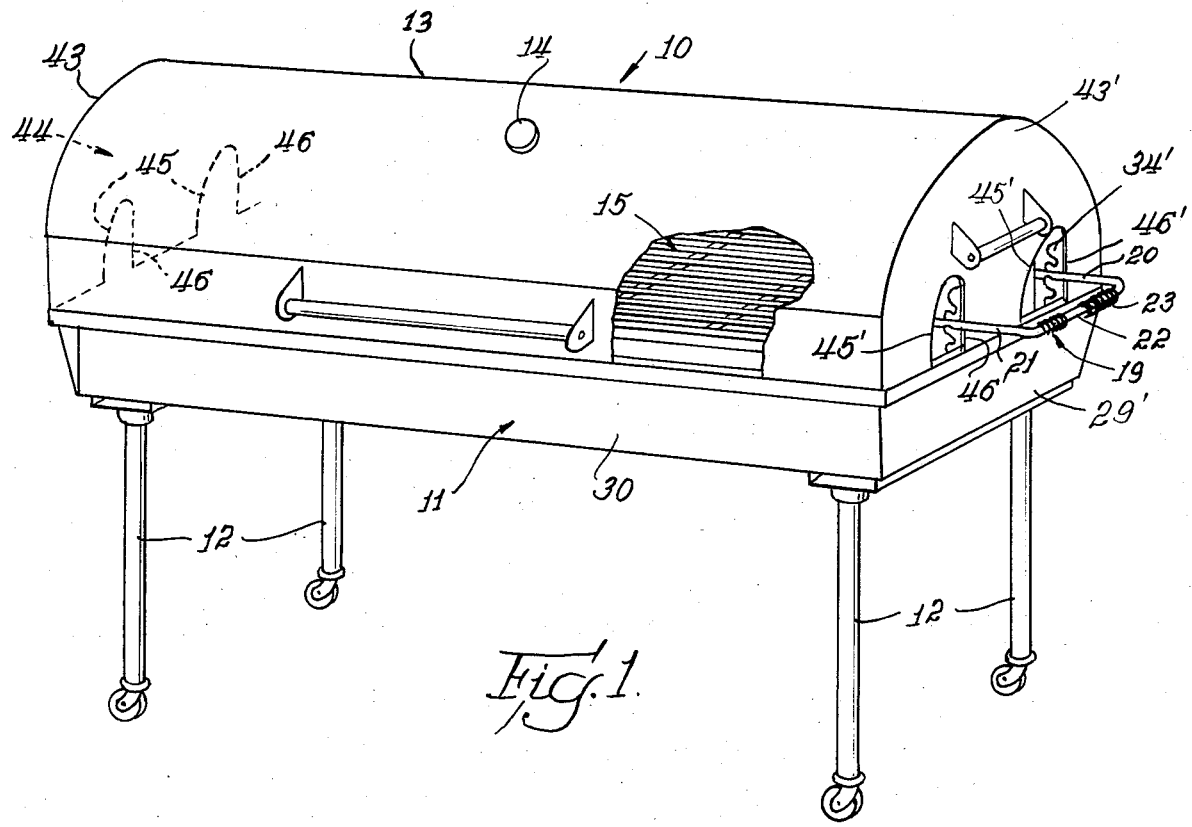
FIG. 1 is a perspective view of a cooking device having a firebox and a domed lid thereover and includes the slant adjustable grill in the preferred form of the invention arranged therewith to be adjustable from the exterior of the device.

FIG. 1 shows a perspective view of a large outdoor cooking device 10 having a firebox 11 for the placement of charcoal, wood, mesquite, or other suitable materials for firing the cooking device. The cooking device 10 is supported by four wheeled leg means 12 depending from the corners of the firebox 11. In the preferred embodiment, the cooking device 10 is enclosed by a domed lid 13, such as might be necessary for achieving an oven-tight effect when cooking large fowl or roasts. A thermometer 14 is mounted at the front of the lid 13 for monitoring the cooking procedure.

A portion of domed lid 13 is broken away to disclose the positioning of a slant adjustable grill 15 upon which the food to be cooked is placed in the normal fashion. In FIG. 1, the grill 15 is positioned in a horizontal plane.

As best viewed in FIG. 3, the grill 15 is formed by a plurality of longitudinal grill members 16 which are affixed by suitable means, such as welding, onto transverse grill support rods 17. In the preferred embodiment, the grill 15 can accommodate a large amount of food and has a width of about 24 inches and a length of about 60 inches. Along the two opposite long edges of the grill 15, rigidifying channels 18 are provided for additional sturdiness. In the exemplary embodiment, the longitudinal grill members 16 are ¼ inch diameter cold rolled steel members and the transverse grill support rod 17 are ½ inch diameter cold rolled steel members. Preferably, these grill members are nickel/chrome plated as is typical in cooking grill manufacture.

The grill 15 is removable and includes oppositely extending handle means. When viewing the deive 10 from the front, as shown in FIG. 1, the right hand side of the grill 15 has a handle means 19 which includes front and rear extending arms 20 and 21 integrally formed with a transverse handle portion 22. The handle portion 22 is affixed with a pair of barrel spring members 23 to render the handle easier to hold and also to provide a safety feature preventing the user's hands from contacting any hot metal parts. The extending arms 20 and 21 are parallel and weld-engaged to the two adjacent transverse grill support rods 17. The extending arms 20 and 21 extend outwardly from the end of the grill member 15 for a distance of about six to seven inches. At the left side of the grill 15, an opposite handle means 24 is provided having substantially the same construction as for the handle means 19 wherein front and rear extending arms 25 and 26 are integrally formed with a transverse handle portion 27. The handle portion 27 similarly is affixed with pair of barrel springs 28.

Figure 2:
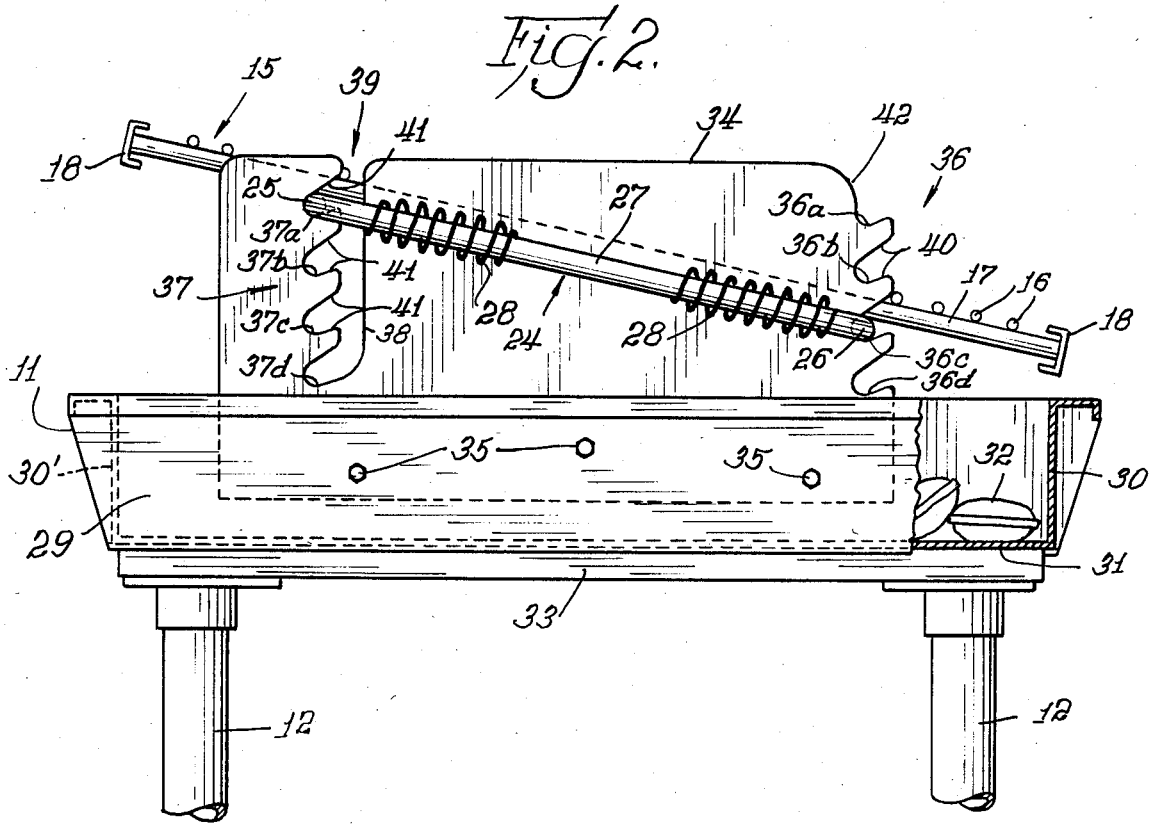
FIG. 2 is an end view of the slant adjustable grill of FIG. 1 showing the grill adjusted to a forward sloping position achieved by a selective engagement with the preferred form of the slotted grill support panel at one end of the firebox.

With reference now made to FIGS. 2 and 3, it will be observed that the firebox 11 is formed of bent sheet steel to create opposite end walls 29 and 29', a front wall 30 and a rear wall 30'. The front and rear walls 30 and 30' are integrally connected by a bottom portion 31 which forms the fire bed for the positioning of charcoal 32 thereover. To strengthen the firebox 11, a plurality of reinforcing channels 33 may be weld-engaged beneath the fire bed 31 whereby the cooking device 10 is rendered quite sturdy and may hold a large amount of charcoal 32. While the source of heat is shown to be charcoal, it would be understood that other suitable combustible materials might be utilized.

The multiple adjustment capabilities of the slant adjustable grill 15 are made possible by the provision of grill support panels 34 and 34' which are, respectively, the left and right grill supports for the handle means 24 and 19, as will be explained hereinafter.

With specific reference made to FIG. 2, it will be observed that the grill support panel 34 is a flat plate-like member which is affixed by means of bolts 35 to the end wall 29 of the firebox 11. The grill support panel 34 is provided with a pair of slot means 36 and 37. It will be understood that the grill support panel 34', attached to the opposite end wall 29', is a mirror image of panel 34 and therefore bears reference numerals 35', 36', 37', etc., for the corresponding elements. A description of panel 34 equally describes the configuration of panel 34' engaged by handle means 19.

The slot means 36 may also be referred to as the front set of slots with slot means 37 comprising rear slots. The front slot means 36 is comprised of, in preferred form, a row of four slanted slots 36a, 36b, 36c and 36d. Each of the slots has a generally circular bottom provided with a diameter preferably being slightly greater than the diameter of extending arms 20, 21, 25 and 26. In the disclosed embodiment, the extending arms of the handle means 19 and 24 all have a diameter of about ½ inch and the diameter of the slots are about 1/32 of an inch larger. The rear slot means 37 comprises a plurality of slanted slots 37a, 37b, 37c and 37d, each also having a diameter of about 1/32 of an inch larger than the diameter of the extending arms 20, 21, 25 and 26. Accordingly, the grill 15 is adapted to be reversible wherein the handle means 19 is capable of engagement at panel 34 and handle means 24 is capable of engagement at panel 34'. Although the diameters at the bottoms of the slanted slots may be substantially the same as the diameters of the extending arms, it is desirable for purposes of adjustment to provide this tolerance.

It will be observed from FIG. 2 that the front slot means 36 are formed at the leading edge of the grill support panel 34 and are frontwardly open. The rear slot means 37 are formed along the grill support panel 34 whereby to have a generally vertical slot edge 38 defining a passageway 39 in front of slots 37a–d allowing for vertical movement of the extending arm 25 during relocations from one slanted slot to another. The slots 36a–d include generally parallel sloping walls 40 continuous with, and tangent to, the circular bottom portions of the slots. Similarly, the rear slanted slots 37a–d are provided with tangential and parallel slanted wall sections 41 continuous with the circular bottom portions of the slots. At the upper slot 37a, the slanted wall 41 is return-radiused to be tangent to the top edge of the support panel 34. At slot means 36, the upper slot 36a is formed with a tangential but generally vertical wall 42 which is also radiused to return to the upper edge of the panel. Thus, slot 36a is seat-like in shape. The configuration of slot 36a permits free upward displacement of the extending arm 26, such as when the grill 15 is required to be pivoted around the rear extending arms in order to expose the fire bed 31 and charcoal 32.

To facilitate the pivoting of the grill 15, it will be understood that the extending arm 20 of the handle means 19 and the extending arm 25 of the handle means 24 remain seated in their corresponding upper slots 37a and 37'a. Just prior to pivoting, the extending arm 21 of the handle means 19 and the extending arm 26 of the handle means 24 are seated in the upper slots 36a and 36'a. Upon rotating the grill 15 around coaxial arms 20 and 25, the grill 15 will move back and away from the front wall 30 until it contacts and rests along the top of the back wall 30' of firebox 11. The grill 15 may be left in this open position without the user being required to support it during, for example, restoking the charcoal 32, or cleaning fire bed 31.

The mirror image grill support panels 34 and 34' are mounted to the end walls 29 and 29' at the same height and at the same spacing between long walls 30 and 30', whereby the slot means 36, 36', and 37, 37', respectively, reside in vertical planes that are perpendicular to the panels 34, 34' and wherein the four "a", "b", "c" and "d" slots respectively reside in four different planes, all being parallel to firebed 31. Thus, when all four of the extending arms 20, 21, 25 and 26 are disposed at the corresponding uppermost, or "a" slot, the grill 15 would be arranged to be parallel to the plane of the fire bed 31, and the longitudinal grill members parallel to walls 30, 30'.

In order to facilitate changing the elevation of the grill 15 above the charcoal 32, two people may stand at opposite sides of the device 10 and grasp the handle means 19 and 24. Thereafter, an upward slanted movement will dislodge the extending arms 20 and 25 from their respective engagements at slanted slots 37' and 37 to be in a freely movable vertical path within passages 39' and 39. At the same time, extending arms 21 and 26 would move outwardly to be free of the slanted slots 36' and 36 at the forward edges of the support panels 34' and 34. Then the grill 15 may be moved upwardly or downwardly, with arms 20 and 25 maintained in paths 39', 39, until all four arms are positioned adjacent the next selected slots. Of course, the arms 20 and 25 may be lifted outwardly of passages 39' and 39 to completely remove the grill 15 from the device 10, such as might be required for cleaning.

In the disclosed embodiment, the distance between the parallel panels 34 and 34' is about 60 inches. The spacing between the slanted slots 36 and 37, and 36' and 37', is 14½ inches. The center-to-center vertical spacing between vertical slots is 1½ inches. Since there are four slot elevations, the range of vertical adjustment to the handle means 19 and 24 is 4½ inches between the top "a" slots to the bottom "d" slots. The passages 39 and 39' are disclosed as having a width of about ¾ inch.

When all four of the extending arms of the two handle means are lodged in the lowest "d" slots at the panels 34 and 34', the longitudinal grill members 16 are arranged about 5½ inches above the fire bed 31. Upon the lodgement of all the extending arms at the upper most "a" slots at the panels 34 and 34', the longitudinal grill members 16 are arranged about 10 inches above the fire bed 31. Thus, the grill 15 may be placed in parallel planar relationship with the fire bed 31 either very closely at the lower slots, or at an increased distance at the uppermost slots, dependent upon the choice of the chef with respect to creating the proper temperature for the food stuffs to be cooked residing atop the grill members 16.

In preferred form, the slanted slots 36a-d, 36'a-d, 37a-d and 37'a-d, all slope downwardly at about 45°. The purpose of the sloped, or slanted, slots is to prevent unintended dislodgement of the handle means 19 or 24 from the grill support panels 34' or 34, such as by accidental bumping. When the extending arms are nested within the slots, a very secure and safe positioning is achieved. In order to adjust the disposition of the grill 15, the user is therefore required to grasp the handle means 19 and 24 and move them upwardly and outwardly at the inclination defined by the tangential walls 40, 40', 41 and 41', as would be clear.

The invention also allows for a front/back slant adjustment of the grill 15. With reference to FIG. 2, it will be observed that at this left side of the cooking device 10, the handle means 24 is sloped forwardly toward the chef, whereby the extending arm 26 is lodged in slanted slot 36c, and the extending arm 25 is lodged in the slanted slot 37a. Accordingly, when different food items are required to be contemporaneously cooked at different temperatures, such as rare and well-done steaks, the rear of the grill 15, toward back wall 30', may be employed for the rare steaks and the front side, closer to wall 30, may be used for the well-done steaks. The invention, in preferred form, allows for the front/back slanting of the grill 15 to be made wherein the extending arms 25 and 26, and corresponding arms 20 and 21, may be placed in slot elevations which differ by a maximum of two spacings. The slope of the grill 15 may be reversed wherein the extending arm 26 resides at a higher slot elevation than the extending arm 25. However, when a cover, such as domed lid 13, is used over the firebox 11, it would be impractical for the grill to be sloped backwardly away from the front wall 30 of the firebox 11. When a domed lid 13 is not used, the slant adjustable grill 15 may be slanted downwardly toward the back wall 30'.

The front/back slope adjustment is easily achieved by firstly disengaging the extending arms from the previously-engaged slots and thereby disposing the extending arms 20 and 25 within the vertical passages 39' and 39, respectively. Thereafter, the rear extending arms 20 and 25 are vertically moved to be placed adjacent the selected slot elevation. While holding extending arms 20 and 25 at the selected position, the grill 15 may then be slightly rotated to dispose the front extending arms 21 and 26 adjacent the chosen slot elevation at the forward slot means 36' and 36, respectively. Lastly, the grill 15 is then moved at the slant incline downwardly within the selected slots at both the front and rear extending arms until the extending arms are disposed within the circular bottom of the slanted slots. The spacing between the slot means 36 and 37, and 36' and 37', coupled with the arrangement of the frontwardly open front slanted slots and the vertical passages 39 and 39' adjacent the rear slanted slots, allows for this transverse, or front/back adjustability.

It will be appreciated from FIG. 2 that the long edges of the grill 15 residing adjacent the channels 18 bring the edge-most longitudinal grill members 16, at opposite sides of the grill 15, either very close to the fire bed 31, as shown at the right-hand side of FIG. 2, or at a significantly larger spacing, such as shown at the left-hand side of FIG. 2, generally above back wall 30'.

While the disclosed embodiment envisions the difference in elevation between the front and rear extending arms to be no greater than two spacings, clearly it will be understood that with the large-volume cooking capacity of the device 10, the front/back sloping adjustment positions the longitudinal grill member 16 in a wide range of differing elevations above the fire bed 31 in satisfaction of most contemporaneous cooking needs for different food items. An increase in the number of slanted slots, and change in the center-to-center spacing thereof, would allow for a different maximum space difference between the front and back extending arms, as would be clear to one skilled in the art.

With reference now made to FIG. 4, it will be observed that the invention additionally provides for a left/right slant adjustment to the grill 15. FIG. 4 shows the positioning of the handle means 19 at the uppermost, or "a", slots at slot means 36' and 37'. At the opposite end of the grill member 15, the handle means 24 is arranged whereby the extending arms are disposed in the lowermost, or "d", slots of slot means 36 and 37. The configuration in FIG. 4 is thus a leftwardly sloping inclination for the grill 15 wherein the longitudinal grill members 16 move from an elevation of from about 10 inches above the fire bed 31 to the opposite side at about 5½ inches from the fire bed. Accordingly, a great range of distances is provided whereby variable cooking temperatures may be experienced in order to facilitate the contemporaneous heating and cooking of food items on the grill 15. In practice, the skilled chef will quickly learn how food items may be moved from the lowermost to the uppermost end of the longitudinal grill member 16 as might be needed. It is also to be observed that a different volume of combustible materials might be located at one end of the fire bed 31 than at the other end to achieve greater or lesser heating capacities in different zones of the firebox 11.

This left/right slant adjustment may easily be accomplished by one person sliding outwardly the handle means 19 from engagement with the slot means 36' and 37' and then relocate the extending arms 20 and 21 to the next chosen slot elevation. Then by moving to the left side of the cooking device 10, a similar adjustment to the handle means 24 may take place, if necessary, with respect to the slot means 36 and 37 of the support panel 34. In this mode the extending arms 20 and 21 are arranged at one slot elevation and at panel 34' extending arms 25 and 26 are arranged at a different slot elevation at panel 34. For this left/right adjustment, the elevational difference between the handle means 19 and handle means 24 may be the maximum of three slot spacings as is shown on FIG. 4. Due to a greater length then width for the grill 15, a larger elevational difference is available to achieve this variation since the angle of inclination is much less than the forward/backward adjustment shown in FIG. 2. Also, the lengths of the extending arms allow for longitudinal "play" inwardly and outwardly of the panels 34 and 34'.

It will be appreciated that the simple vertical adjustment of the grill 15 may also be made by one person initially changing the elevation of the handle means 19 to a chosen height and thereafter moving the handle means 24 to the corresponding slot elevation at the other end of the device 10.

Another significant achievement is provided by the invention wherein all the foregoing adjustments, with the exception of pivoting open the grill 15, may be achieved while the domed lid 13 remains over the firebox 11. With reference again made to FIG. 1, it will be seen that the domed lid 13 is provided with generally parallel flat end faces 43 and 43' at the left and right ends of the device 10, respectively. Pairs of cut-outs 44 and 44' are correspondingly provided at the faces 43 and 43' whereby to expose the slanted slot means 36, 37 and 36', 37'. The cut-outs are downwardly open and include vertical edges 46 and 46', which return to a downwardly curving edge 45 and 45'. The cut-outs 44 and 44' are slightly wider than the slanted slot means 36, 37 and 36', 37', whereby to allow for the above-described adjustments of the handle means 19 and 24 while the lid 13 is closed over the fire box 11.

In the exemplary embodiment, the domed lid 13 is hingedly affixed (not shown) to the back wall 30' of the firebox 11, whereby to be pivotable to an open position. When pivoted to the open position, the grill 15 may be moved whereby to dispose the extending arms 20 and 25 in the upper slots 37'a and 37a, and thereafter pivoted until the grill 15 contacts and rests against the opened domed lid 13.

In the preferred embodiment, the forward/backward slant adjustment of the grill 15 permits the grill to be placed at a zero slope arrangement, i.e., parallel to the fire bed 31, ar at slope of from about one inch drop per five inches or at about one inch drop per ten inches. The slant adjustment in the left/right arrangement, as shown in FIG. 4, permits arranging the grill 15 either at zero slope, or an inclination of about one inch drop per 40 inches, about one inch drop per 20 inches, or about one inch drop per 13 inches.

Further advantages and benefits of the invention will be understood by those skilled in the art. While the foregoing description is directed to the exemplary embodiment as depicted in FIGS. 1–4, it will be understood that a wide range of equivalents fall within the scope of the invention as hereinafter claimed.

What is claimed is:

1. A slant adjustable grill assembly for use with an outdoor cooking device of the type having a firebox including opposing end walls, front and rear walls, and a fire bed means for holding charcoal and the like, the slant adjustable grill assembly comprising: a plurality of longitudinal grill members and transverse grill support members, a pair of opposing handle means, said handle means each including front and rear extending arms being affixed to said transverse support members and extending outwardly from the longitudinal support members, said extending arms joined by a transverse handle portion; a pair of grill support panels affixed vertically in parallel relationship at said opposite end walls of the firebox, said grill support panels having first slanted slot means formed at a front edge thereof and capable of receiving the front extending arms of each handle means, the grill support panels further having a second slanted slot means spaced from said first slanted slot means a sufficient distance to accommodate the rear extending arms of each handle means, said second slanted slot means being formed with an adjacent vertical passage for accommodating vertical movement of the rear extending arms therein, said grill support panels being substantially identical wherein the first and second slot means of either panel comprises a corresponding number of vertically spaced slanted slots residing in spaced apart horizontal planes passing through the corresponding slots of both panels, the slots of the first and second slot means at one panel residing in a vertical plane parallel to the slots of the first and second slot means of the other panel, said handle means being selectively engageable at said extending arms with said first and second slanted slot means whereby the grill is fully removable and adjustable to be pivotably opened, placed parallel to the fire bed, or slanted in a left/right or front/back orientation, wherein the front extending arms of each handle means may be engaged at said first slot means of both panels at one horizontal plane while the rear extending arms may be engaged at the second slanted slot means of both panels at a second horizontal plane, and wherein both the front and rear extending arms of one said handle means may both engage the first and second slanted slot means of one panel at one horizontal plane while the front and rear extending arms of the other handle means may engage the first and second slanted slot means of the other panel at a second horizontal plane and wherein the front and rear extending arms of both handle means may be engaged at the first and second slot means of both said panels at the same horizontal plane, wherein said slant adjustable grill may be arranged to have the rear extending arms of both handle means engaged at an uppermost slot of the second slanted slot means at both said grill support panels and said slant adjustable grill thereby being capable of being pivotably opened away from said firebox, and said extending arms being fully disengageable from said first and second slot means, said grill assembly further including a lid capable of being opened and closed over the firebox and grill, said lid including opposing access cut-out means therethrough arranged whereby to accommodate the extending arms of said handle means therein and expose said slanted slot means of the grill support panels when the lid is closed, whereby said grill may be adjusted at said grill support panels to be parallel to said fire bed, sloped forwardly or backwardly, sloped downwardly to the left or right, while the lid remains closed over the fire box.

2. A slant adjustable grill as claimed in claim 1 wherein said first and second slanted slot means comprise four corresponding slanted slots, whereby corresponding slanted slots reside in four separate horizontal planes, whereby in each said horizontal plane two slots at one panel reside in the same plane as two slots of the other panel.

3. A slant adjustable grill as claimed in claim 1 wherein the slanted slots slope downwardly toward the rear wall of said firebox.

4. A slant adjustable grill as claimed in claim 1 wherein said firebox is rectangular in plan, and said longitudinal grill members and transverse grill support members form a smaller rectangular configuration in plan being spaced inwardly of the walls of the firebox.

5. A slant adjustable grill assembly as claimed in claim 1 wherein the lid includes opposite end walls arranged generally above the opposing end walls of said firebox, said opposite end walls of the lid formed to provide said access cut-out means therethrough, the access cut-out means at each end wall comprising a pair of cut-outs of a size capable of exposing the first and second slot means of the corresponding grill support panel and capable of accomodating said front and rear extending arms of the corresponding handle means whereby to facilitate said grill adjustment.

6. In combination, a cooking device having a firebox formed with two opposing long walls and two transversely positioned opposing shorter end walls, a fire bed means formed with said walls defining a bed for the disposition of a source of heat; a pair of support panels each having a plate-like configuration and being oppositely mounted to the shorter end walls of said firebox, said support panels having a length less than said end walls and including first and second rows of open slots, each row of slots comprising a plurality of vertically spaced-apart slanted slots, the first row of slanted slots being formed along a forward edge of the panels and the second row of slanted slots formed along the panels rearwardly of the first row, all said slots being slanted in the same direction, said first and second sets of slots having a one-to-one horizontal planar relationship at each panel, the first row of slots at both said panels residing in the same vertical plane and the second row of slots of both said panels residing in a parallel different vertical plane, the second row of slots formed with a vertical passage opening upwardly of the panels; a slant adjustable grill including a grill surface formed by longitudinal grill members supported therebelow by transverse support members and forming a generally rectangular configuration, a pair of opposing handle means extending outwardly of said grill surface, the handle means each including front and rear extending arms affixed to said transverse support members at opposite sides of said grill surface, said extending arms projecting a distance sufficient to extend beyond the end walls of said firebox and being joined by a transverse member forming a handle portion; said extending arms being circular in section and said first and second rows of slots having circular seat portions cooperatively engageable with the extending arms, said circular seat portions having a diameter no less than the diameter of said extending arms, wherein the spacing between said extending arms of each handle means is substantially the same as the distance between the parallel vertical planes passing through said first and second rows of slots of said support panels, the front extending arms of said handle means the rear extending arms of said handle means being coaxial, respectively, the rear extending arms of said handle means engaging in the second row of slots of the respective panels in a first horizontal plane and the front extending arms engaging the first row of slanted slots of the respective panels in a second horizontal plane, whereby said slant adjustable grill is transversely sloped with respect to the long axis of said rectangular firebox; and, a removable lid resting atop said firebox to enclose said grill surface, said lid including opposite wall means residing generally above the opposing end walls of said firebox, said opposite wall means of the lid including a pair of access cut-outs of sufficient size to fully expose the first and second rows of slots of the grill support panels, the front and rear extending arms of said handle means projecting through said access cut-outs outwardly of the lid, said access cut-outs being downwardly open toward said end walls of the firebox.

7. In combination, a cooking device having a firebox formed with two opposing long walls and two transversely positioned opposing shorter end walls, a fire bed means formed with said walls defining a bed for the disposition of a source of heat; a pair of support panels each having a plate-like configuration and being oppositely mounted to the shorter end walls of said firebox, said support panels having a length less than said end walls and including first and second rows of open slots, each row of slots comprising a plurality of vertically spaced-apart slanted slots, the first row of slanted slots being formed along a forward edge of the panels and the second row of slanted slots formed along the panels rearwardly of the first row, all said slots being slanted in the same direction, said first and second sets of slots having a one-to-one horizontal planar relationship at each panel, the first row of slots at both said panels residing in the same vertical plane and the second row of slots of both said panels residing in a parallel different vertical plane, the second row of slots formed with a vertical passage opening upwardly of the panels; a slant adjustable grill including a grill surface formed by longitudinal grill members supported therebelow by transverse support members and forming a generally rectangular configuration, a pair of opposing handle means extending outwardly of said grill surface, the handle means each including front and rear extending arms affixed to said transverse support members at opposite sides of said grill surface, said extending arms projecting a distance sufficient to extend beyond the end walls of said firebox and being joined by a transverse member forming a handle portion; said extending arms being circular in section and said first and second rows of slots having circular seat portions cooperatively engageable with the extending arms, said circular seat portions having a diameter no less than the diameter of said extending arms, wherein the spacing between said extending arms of each handle means is subtantially the same as the distance between the parallel vertical planes passing through said first and second rows of slots of said support panels, the front extending arms of said handle means and the rear extending arms of said handle means being coaxial, respectively, the front and rear extending arms of one said handle means engaging the first and second rows of slots at the respective panel in a first horizontal plane and the front and rear extending arms of the other handle means engaging the first and second rows of slots at the other panel in a second horizontal plane, whereby said slant adjustable grill is longitudinally sloped between the support panels with respect to the long axis of the fire box; and, a removable lid resting atop said firebox to enclose said grill surface, said lid including opposite wall means residing generally above the opposing end walls of said firebox, said opposite wall means of the lid including a pair of access cut-outs of sufficient size to fully expose the first and second rows of slots of the grill support panels, the front and rear extending arms of said handle means projecting through said access cut-outs outwardly of the lid, said access cut-outs being downwardly open toward said end walls of the firebox.

8. In combination, a cooking device having a firebox formed with two opposing long walls and two transversely positioned opposing shorter end walls, a fire bed means formed with said walls defining a bed for the disposition of a source of heat; a pair of support panels each having a plate-like configuration and being oppositely mounted to the shorter end walls of said firebox, said support panels having a length less than said end walls and including first and second rows of open slots, each row of slots comprising a plurality of vertically spaced-apart slanted slots, the first row of slanted slots being formed along a forward edge of the panels and the second row of slanted slots formed along the panels rearwardly of the first row, all said slots being slanted in the same direction, said first and second sets of slots having a one-to-one horizontal planar relationship at each panel, the first row of slots at both said panels residing in the same vertical plane and the second row of slots of both said panels residing in a parallel different vertical plane, the second row of slots formed with a vertical passage opening upwardly of the panels; a slant adjustable grill including a grill surface formed by longitudinal grill members supported therebelow by transverse support members and forming a generally rectangular configuration, a pair of opposing handle means extending outwardly of said grill surface, the handle means each including front and rear extending arms affixed to said transverse support members at opposite sides of said grill surface, said extending arms projecting a distance sufficient to extend beyond the end walls of said firebox and being joined by a transverse member forming a handle portion, said extending arms being circular in section and said first and second rows of slots having circular seat portions cooperatively engageable with the extending arms, said circular seat portions having a diameter no less than the diameter of said extending arms, wherein the spacing between said extending arms of each handle means is substantially the same as the distance between the parallel vertical planes passing through said first and second rows of slots of said support panels, the front extending arms of said handle means and the rear extending arms of said handle means being coaxial, respectively, the front and rear extending arms of both said handle means engaging the first and second rows of slots at the respective panels all in the same horizontal plane, whereby the slant adjustable grill is parallel to the fire bed means; and, a removable lid resting atop said firebox to enclose said grill surface, said lid including opposite wall means residing generally above the opposing end walls of said firebox, said opposite wall means of the lid including a pair of access cut-outs of sufficient size to fully expose the first and second rows of slots of the grill support panels, the front and rear extending arms of said handle means projecting through said access cut-outs outwardly of the lid, said access cut-outs being downwardly open toward said end walls of the firebox.

* * * * *

UNITED STATES PATENT AND TRADEMARK OFFICE
CERTIFICATE OF CORRECTION

PATENT NO. : 4,592,335
DATED : June 3, 1986
INVENTOR(S) : Frank W. Beller

It is certified that error appears in the above-identified patent and that said Letters Patent are hereby corrected as shown below:

Col. 1, line 13, change "square and" to --square feet and--;
Col. 1, line 37, delete the word "a";
Col. 2, line 52, change "upons" to --upon--;
Col. 3, line 41, change "rod" to --rods--;
Col. 3, line 45, change "deive" to --device--;
Col. 3, line 63, change "with pair" to --with a pair--;
Col. 5, line 15, change "cleaning fire bed" to --cleaning the fire bed--;
Col. 5, line 25, change "firebed" to --fire bed--;
Col. 5, line 56, change "inch" to --inches--;
Col. 7, line 31, change "member" to --members--;
Col. 7, line 50, change "then" to --than--;
Col. 8, line 11, change "fire box" to --firebox--;
Col. 8, line 23, change "ar at" to --at a--;
Col. 9, line 35, change "fire box" to --firebox--;
Col. 9, line 36, change "claim" to --Claim--;
Col. 9, line 43, change "claim" to --Claim--;
Col. 9, line 52, change "claim" to --Claim--;
Col. 9, line 59, change "accomodating" to --accommodating--;

UNITED STATES PATENT AND TRADEMARK OFFICE
CERTIFICATE OF CORRECTION

PATENT NO. : 4,592,335

DATED : June 3, 1986

INVENTOR(S) : Frank W. Beller

It is certified that error appears in the above-identified patent and that said Letters Patent is hereby corrected as shown below:

Column 10, line 35, change "means the" to --means and the--;

Signed and Sealed this

Thirtieth Day of September 1986

[SEAL]

Attest:

Attesting Officer

DONALD J. QUIGG

Commissioner of Patents and Trademarks